(12) United States Patent
Shen

(10) Patent No.: US 11,481,068 B1
(45) Date of Patent: Oct. 25, 2022

(54) TOUCH-TO-DISPLAY INTERFERENCE MITIGATION IN TOUCH DISPLAYS

(71) Applicant: Synaptics Incorporated, San Jose, CA (US)

(72) Inventor: Guozhong Shen, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/470,841

(22) Filed: Sep. 9, 2021

(51) Int. Cl.
*G06F 3/041* (2006.01)
*G06F 3/044* (2006.01)

(52) U.S. Cl.
CPC ........ *G06F 3/04182* (2019.05); *G06F 3/0412* (2013.01); *G06F 3/044* (2013.01); *G09G 2310/067* (2013.01)

(58) Field of Classification Search
CPC ...... G06F 3/041–047; G06F 2203/041–04114; G06F 3/04166; G06F 3/04182; G06F 3/04184; G06F 2203/04101; G09G 2310/066; G09G 2310/08; G09G 2300/0861; G09G 2310/06; G09G 2310/067

See application file for complete search history.

(56) References Cited

U.S. PATENT DOCUMENTS

2020/0310566 A1* 10/2020 Chen ................... G06F 3/03547

* cited by examiner

*Primary Examiner* — Sanjiv D. Patel
(74) *Attorney, Agent, or Firm* — Ferguson Braswell Fraser Kubasta PC

(57) ABSTRACT

An input-display device includes a display screen with display pixels, capacitive sensing electrodes for capacitive sensing in a sensing region of the display screen, and a gate driver circuit associated with the display screen. The gate driver circuit superimposes a critical time window on a full-duration gate control pulse of a gate control signal. The critical time window partially overlaps with the full-duration gate control pulse at least at an end of the full-duration gate control pulse. The gate driver circuit further determines that a transient in a sensing waveform of the capacitive sensing occurs in the critical time window superimposed on the full-duration gate control pulse, and based on the determination, shorten the full-duration gate control pulse to obtain a reduced-duration gate control pulse. The gate driver circuit provides the reduced-duration gate control pulse to a pixel circuit of one of the display pixels.

20 Claims, 8 Drawing Sheets

| DAC Code | DAC Voltage | Result with T1 | Result with T2 | Delta | Delta Code | DAC Code after Compensation | Result with T2 (compensated) | New Delta | New Delta Code |
|---|---|---|---|---|---|---|---|---|---|
| 181 | 2.8281 | 2.8281 | 2.8281 | 0 | 0.0 | 181 | 2.8281 | 0 | 0 |
| 8 | 0.125 | 0.1432 | 0.1745 | -0.0313 | -2.0 | 6 | 0.1438 | -0.0006 | 0 |
| 71 | 1.1094 | 1.1027 | 1.0913 | 0.0114 | 0.7 | 72 | 1.1067 | -0.004 | -0.3 |
| 12 | 0.1875 | 0.1937 | 0.2044 | -0.0107 | -0.7 | 11 | 0.189 | 0.0047 | 0.3 |
| 25 | 0.3906 | 0.3893 | 0.3869 | 0.0024 | 0.2 | 25 | 0.3869 | 0.0024 | 0.2 |
| 211 | 3.2969 | 3.2773 | 3.2436 | 0.0337 | 2.2 | 213 | 3.2743 | 0.003 | 0.2 |
| 178 | 2.7813 | 2.7847 | 2.7907 | -0.006 | -0.4 | 178 | 2.7907 | -0.006 | -0.4 |
| 81 | 1.2656 | 1.2758 | 1.2934 | -0.0176 | -1.1 | 80 | 1.278 | -0.0022 | -0.1 |
| 243 | 3.7969 | 3.7798 | 3.7505 | 0.0293 | 1.9 | 245 | 3.7812 | -0.0014 | -0.1 |
| 9 | 0.1406 | 0.1653 | 0.2076 | -0.0423 | -2.7 | 6 | 0.1616 | 0.0037 | 0.2 |

Simulation Example 600

FIG. 6

HCK: Clock Signal
HCKB: Inverted Clock Signal
VGH: High Supply Voltage
VGL: Low Supply Voltage
RST: Reset Signal
$G_n$: n-th Gate Control Signal

TOUCH-TO-DISPLAY INTERFERENCE MITIGATION IN TOUCH DISPLAYS

TECHNICAL FIELD

The described embodiments relate generally to electronic devices, and more specifically to input-display devices.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are often combined with display devices to operate as input-display devices (such as touch screens integrated in cellular phones).

In an input-display device, the proximity sensor device and the display device may be highly integrated. The high integration may result in parasitic capacitances between components of the proximity sensor device and components of the display device. As a result, a sensing waveform, emitted by the proximity sensor device, may capacitively couple onto signals of the display device, thereby causing display artifacts.

SUMMARY

In general, in one aspect, one or more embodiments relate to an input-display device, comprising: a display screen comprising a plurality of display pixels; a plurality of capacitive sensing electrodes for capacitive sensing in a sensing region of the display screen; and a gate driver circuit associated with the display screen and configured to: superimpose a critical time window on a first full-duration gate control pulse of a gate control signal, wherein the critical time window partially overlaps with the first full-duration gate control pulse at least at an end of the first full-duration gate control pulse, make a first determination that a first transient in a sensing waveform of the capacitive sensing occurs in the critical time window superimposed on the first full-duration gate control pulse, based on the first determination, shorten the first full-duration gate control pulse to obtain a reduced-duration gate control pulse, and provide the reduced-duration gate control pulse to a pixel circuit of one of the plurality of display pixels to enable charging of a capacitor of the pixel circuit.

In general, in one aspect, one or more embodiments relate to a display driver circuit for driving a display screen, the display driver comprising: a gate driver circuit configured to: superimpose a critical time window on a first full-duration gate control pulse of a gate control signal, wherein the critical time window partially overlaps with the first full-duration gate control pulse at least at an end of the first full-duration gate control pulse, make a first determination that a first transient in a sensing waveform of a capacitive sensing occurs in the critical time window superimposed on the first full-duration gate control pulse, based on the first determination, shorten the first full-duration gate control pulse to obtain a reduced-duration gate control pulse, and provide the reduced-duration gate control pulse to a pixel circuit of one of a plurality of display pixels of the display screen to enable charging of a capacitor of the pixel circuit.

In general, in one aspect, one or more embodiments relate to a method for driving a display screen of an input-display device, the method comprising: superimposing a critical time window on a first full-duration gate control pulse of a gate control signal, wherein the critical time window partially overlaps with the first full-duration gate control pulse at least at an end of the first full-duration gate control pulse; making a first determination that a first transient in a sensing waveform of a capacitive sensing occurs in the critical time window superimposed on the first full-duration gate control pulse; based on the first determination, shortening the first full-duration gate control pulse to obtain a reduced-duration gate control pulse; and providing the reduced-duration gate control pulse to a pixel circuit of one of a plurality of display pixels of the display screen to enable charging of a capacitor of the pixel circuit.

BRIEF DESCRIPTION OF DRAWINGS

FIG. 6 shows a simulation example, in accordance with one or more embodiments.

DETAILED DESCRIPTION

The following detailed description is merely exemplary in nature and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Input-display devices, such as touchscreens, are widely used in a variety of electronic systems. Input-display devices may include a sensing region, often demarked by a surface. In the sensing region, the input-display device determines the presence, location, motion, and/or force of one or more input objects. As used herein, touch sensing includes proximity (e.g., no contact), touch (e.g., contact on an input surface), and contact with force. Touch sensing is implemented with touch sensors. The touch sensors are electrodes that are used in performing touch sensing. Examples of touch sensing includes mutual or transcapacitive sensing and absolute or self-capacitive sensing. In one or more embodiments, an input-display device includes a display screen. The display screen may be used to display content or information to a user, and the touch sensing may enable the user to interact with the displayed content. The touch sensing may involve driving the touch sensors with a sensing waveform, e.g., a square wave. The presence of the sensing waveform on the touch sensors may cause interference in the display screen. The interference may result in display artifacts, such as darker and/or lighter regions in the display screen, e.g., in a striped pattern. In one or more embodiments, the driving of the display screen is performed such that the effects of the interference are at least partially avoided.

Figure 1:
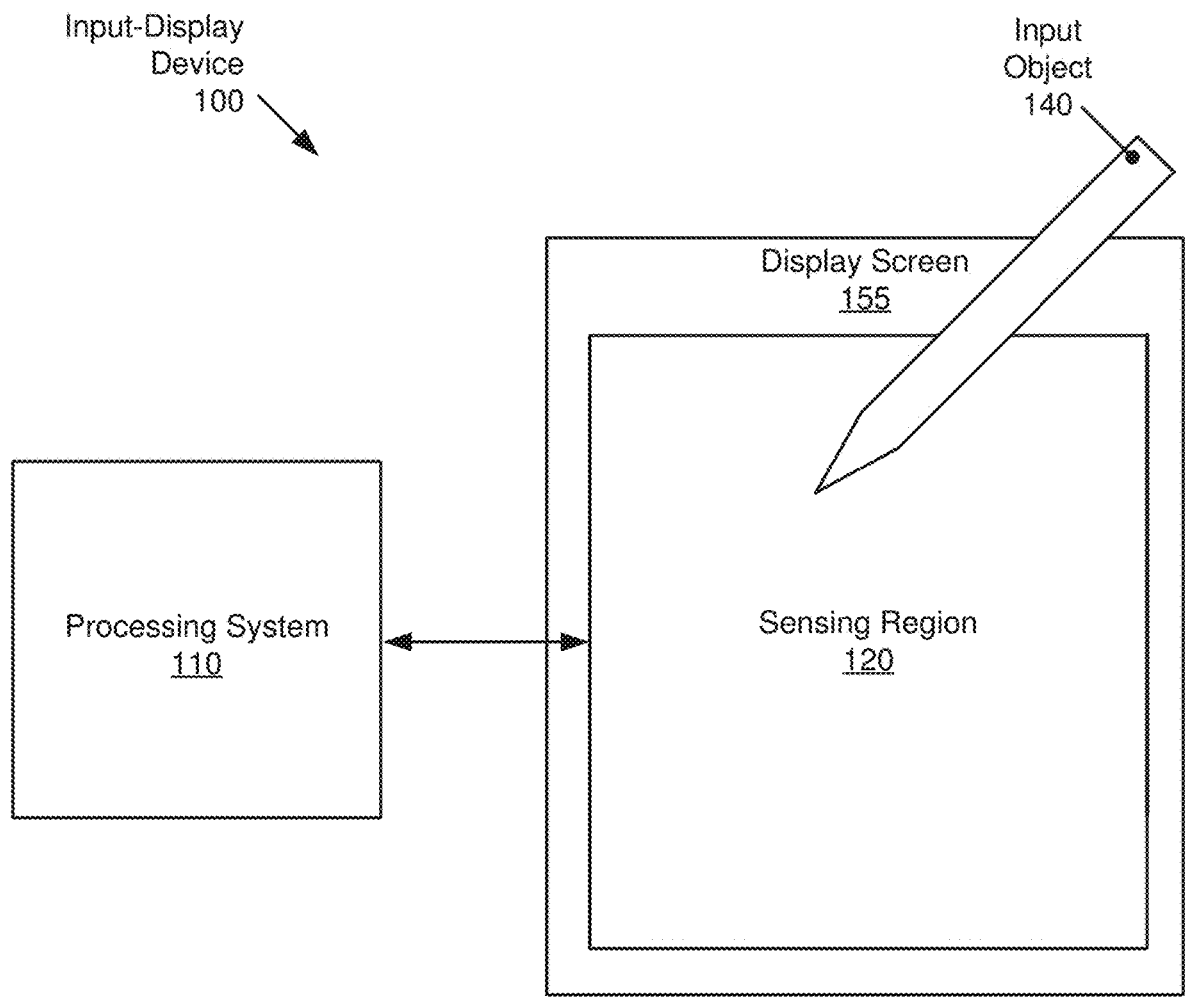
FIG. 1 shows an input-display device, in accordance with one or more embodiments.

FIG. 1 is a block diagram of an example of an input-display device (100), in accordance with one or more embodiments. The input-display device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, smart phones, personal digital assistants (PDAs), automotive infotainment devices, gaming devices, etc.

In FIG. 1, the input-display device (100) includes a proximity and/or force sensor device (e.g., "touchpad" or a "touch sensor device") configured to sense input provided by one or more input objects (140) in a sensing region (120). Example input objects include styli, an active pen, and fingers.

The sensing region (120) encompasses any space above, around, in and/or near the input-display device (100) in which the input device (100) is able to detect user input (e.g., user input provided by one or more input objects). The sizes, shapes, and locations of particular sensing regions may vary widely from embodiment to embodiment.

The input-display device (100) may utilize any combination of sensor components and sensing technologies to detect user input in the sensing region (120). The input-display device (100) includes one or more sensing elements for detecting user input. As a non-limiting example, the input-display device (100) may use capacitive techniques.

In some capacitive implementations of the input-display device (100), voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitance measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter", TX) and one or more receiver sensor electrodes (also "receiver electrodes" or "receiver", RX). Transmitter sensor electrodes may be modulated relative to a reference voltage (e.g. system ground) to transmit transmitter signals. Receiver sensor electrodes may be held substantially constant relative to the reference voltage to facilitate receipt of resulting signals. The reference voltage may be a substantially constant voltage and in various embodiments, the reference voltage may be system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers or may be configured to both transmit and receive. Measurements acquired using mutual capacitance sensing methods may be referred to as mutual capacitance measurements.

The absolute capacitance measurements and/or the mutual capacitance measurements may be used to determine when at least one input object is in a sensing region, determine signal to noise ratio, determine positional information of an input object, identify a gesture, determine an action to perform based on the gesture, a combination of gestures or other information, and/or perform other operations.

In FIG. 1, a processing system (110) is shown as part of the input-display device (100). The processing system (110) is configured to operate the hardware of the input-display device (100) to detect input in the sensing region (120). The processing system (110) includes parts of or all of one or more integrated circuits (ICs) and/or other circuitry components. For example, a processing system may include circuitry for mutual and/or absolute capacitance sensing. In some embodiments, the processing system (110) also includes electronically-readable instructions, such as firmware code, software code, and/or the like. In some embodiments, components composing the processing system (110) are located together, such as near sensing element(s) of the input-display device (100). In other embodiments, components of processing system (110) are physically separate with one or more components close to the sensing element(s) of the input-display device (100), and one or more components elsewhere. For example, the input-display device (100) may be a peripheral coupled to a computing device, and the processing system (110) may include software configured to run on a central processing unit of the computing device and one or more ICs (perhaps with associated firmware) separate from the central processing unit. As another example, the input-display device (100) may be physically integrated in a mobile device, and the processing system (110) may include circuits and firmware that are part of a main processor of the mobile device. In some embodiments, the processing system (110) is dedicated to implementing the input-display device (100). In other embodiments, the processing system (110) also performs other functions, such as driving haptic actuators, etc.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input-display device (100) is implemented with additional input components that are operated by the processing system (110) or by some other processing system. These additional input components may provide redundant functionality for input in the sensing region (120), or some other functionality.

In some embodiments, the input-display device (100) includes a touch screen interface, and the sensing region (120) overlaps at least part of an active area of a display screen (155). For example, the input-display device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), microLED, liquid crystal display (LCD), or other display technology. The proximity and/or force sensor device and the display screen of the input-display device (100) may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While FIG. 1 shows a configuration of components, other configurations may be used without departing from the scope of the invention. For example, various components may be combined to create a single component. As another example, the functionality performed by a single component may be performed by two or more components.

Figure 2:
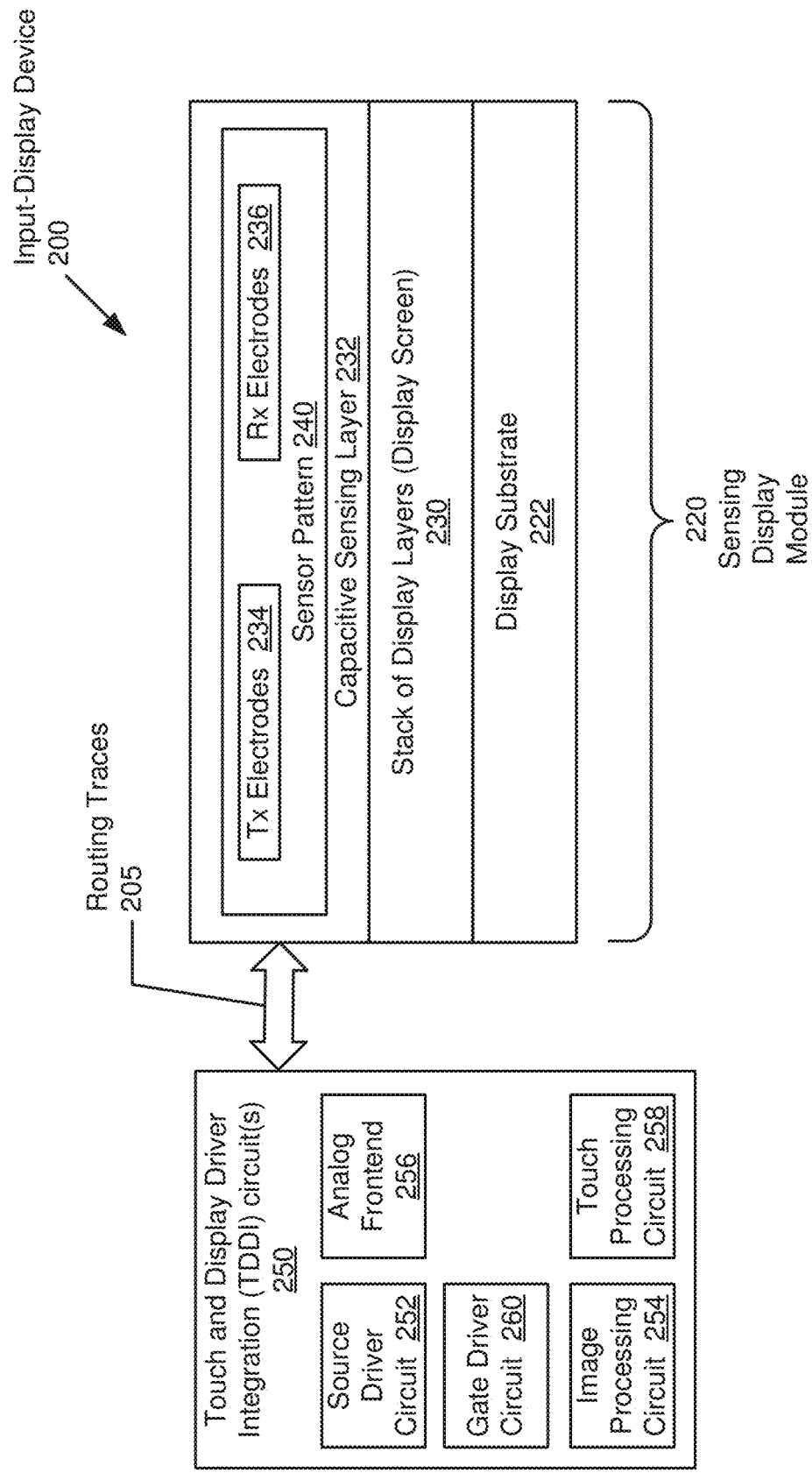
FIG. 2 shows an input-display device, in accordance with one or more embodiments.

FIG. 2 shows an input-display device (200) in accordance with one or more embodiments. As shown in FIG. 2, the input-display device (200) includes a sensing-display module (220) and a touch and display driver integration (TDDI) circuit (250) coupled to the sensing-display module via routing traces (205). The sensing-display module (220) may implement all or a part of the sensing region (120) and all or a part of the display screen (155), discussed above in reference to FIG. 1.

In one or more embodiments, the sensing-display module (220) includes multiple layers including a stack of display layers (230), one or more capacitive sensing layers (232), and a display substrate (222). The display layers (230) form a display screen. In one embodiment, the display screen is an OLED display. Accordingly, the stack of display layers (230) may include OLED display layers such as an organic emissive layer, an anode layer, a cathode layer, one or more conductive layers which may include a thin-film transistor (TFT) layer, etc. The stack of display layers (230) may be disposed on the display substrate (222). In one embodiment, the display substrate (222) is a flexible plastic substrate, to enable a flexible, rollable and/or foldable OLED display.

The stack of display layers (230) may include microLED layers such as a layer of LEDs disposed on a thin-film transistor (TFT) layer on the display substrate (222).

The stack of display layers (230) may include LCD display layers such as a color filter glass layer, a liquid crystal layer, and a TFT layer disposed on the display substrate (222), which may be glass.

The sensing-display module (220) may have additional layers and components. In one or more embodiments, multiple transmitter (TX) (234) and/or receiver (RX) (236) electrodes are disposed in the one or more capacitive sensing layers (232) in a sensing region of the display screen. The sensing region may span all or part of the display screen. The TX (234) and/or RX (236) electrodes may be used in capacitance sensing (e.g., absolute capacitance sensing, mutual capacitance sensing, etc.), as described above in reference to FIG. 1.

While FIG. 2 shows the capacitive sensing layer(s) (232) as being disposed on top of the stack of display layers (230), these layers may be located anywhere, relative to the stack of display layers (230). For example, one layer with RX electrodes (236) may be located on top of the stack of display layers (230), and another layer with TX electrodes (234) may be located in or below the stack of display layers (230). Alternatively, there may be no layer with TX electrodes. In one or more embodiments, the sensing module (220) includes a matrix pad sensor with numerous sensing pads and traces connecting to the sensing pads in a metal mesh layer across the sensing region. The matrix pad sensor may include at least one such metal mesh layer. Instead of using a dedicated metal mesh layer, a display layer, e.g., an OLED display cathode layer may be patterned to serve as a metal mesh layer.

In one or more embodiments, the TX electrodes (234) and the RX electrodes (236), together, implement mutual capacitance sensing. In other words, a waveform is driven onto the TX electrodes (234) and a resulting signal(s) is received from the RX electrodes (236). The resulting signal is a function of the waveform and change in capacitance between the TX electrodes and RX electrodes (234, 236) due to the presence of an input object.

In one or more embodiments, the RX electrodes (236) are operated to perform absolute capacitance sensing independent of the TX electrodes (234). In one or more embodiments, the transmitter electrodes (234) are operated to perform absolute capacitance sensing independent of the receiver electrodes (236).

In one or more embodiments, the stack of display layers (230) includes one or more layers, e.g., a thin-film transistor (TFT) layer, with source lines and gate lines and transistors for controlling the individual OLED, LCD or microLED units of the display pixels (or pixels) of the display screen. In one or more embodiments, one or more source lines and/or one or more gate lines are also operated to perform absolute capacitance sensing.

In one or more embodiments, a touch and display driver integration (TDDI) circuit (250) includes a source driver circuit (252) and a gate driver circuit (260) that drive the transistors controlling the pixels of the display screen. Each of the pixels may include an OLED pixel, a microLED pixel, a microOLED pixel, an LCD pixel, etc. The TDDI circuit (250) may receive an image signal from a host application processor (e.g. a video processor), or any other component (not shown) that provides image content to be displayed on the display screen (155). The received image signal may be in digital form. An image processing circuit (254) may process the received image signal to output a processed image signal. For example, the image processing circuit (254) may perform a mura correction and/or other image processing operations. The source driver circuit (252) and the gate driver circuit (260) in combination drive the pixels of the display screen (155) to produce an image output corresponding to the processed image signal. The source driver circuit (252), for each of the pixels, may generate an analog signal specifying a brightness of the pixel, based on the processed image signal. The gate driver circuit (260) may act as a selector configured to select a particular pixel(s) for programming with the analog signal. For example, in a display screen (155) with pixels arranged in rows and columns, the gate driver circuit (260) may sequentially select different pixels in one (or multiple) row(s) for programming with the analog signal(s) provided by the source driver circuit (252).

In one or more embodiments, the TDDI circuit (250) is further configured to perform capacitance sensing. The TDDI circuit (250) may drive capacitive sensing electrodes (e.g., the TX electrodes (234) or a subset of the TX electrodes (234)), and may receive resulting signals from capacitive sensing electrodes (e.g., from the RX electrodes (236) or a subset of the RX electrodes (236)), to determine the presence and/or position of an input object (e.g., input object (140), discussed above in reference to FIG. 1). The TDDI circuit (250) may include various components. In one embodiment, the TDDI circuit (250) includes an analog frontend (256) configured to perform the capacitance sensing by driving the capacitive sensing electrodes, receiving the resulting signals, and analog-to-digital converting the resulting signals. The digital processing may be performed elsewhere, by a touch processing circuit (258), e.g., a microprocessor, digital signal processor, etc. In one embodiment, the TDDI circuit (228) includes some or all elements of the touch processing circuit (258). Alternatively, the touch processing circuit (258) may be located elsewhere.

In one embodiment, the TDDI circuit (250) is housed in a single semiconductor package, e.g., an application-specific integrated circuit (ASIC). The source driver circuit (252), the gate driver circuit (260), the image processing circuit (254), the analog frontend (256), and/or the touch processing circuit (258) may be on separate dies or on a single die, in the semiconductor package. Additional components, for example, any components associated with displaying and/or processing images, may be included. The semiconductor package may be disposed on the display substrate (222) or elsewhere. In one embodiment, one or more of the source driver circuit (252), the gate driver circuit (260), the image processing circuit (254), the analog frontend (256), and/or the touch processing circuit (258) are discrete components. Further, embodiments of the disclosure may include multiple TDDI circuits, each associated with a different region on the display of the sensing-display module (220).

Figure 3:
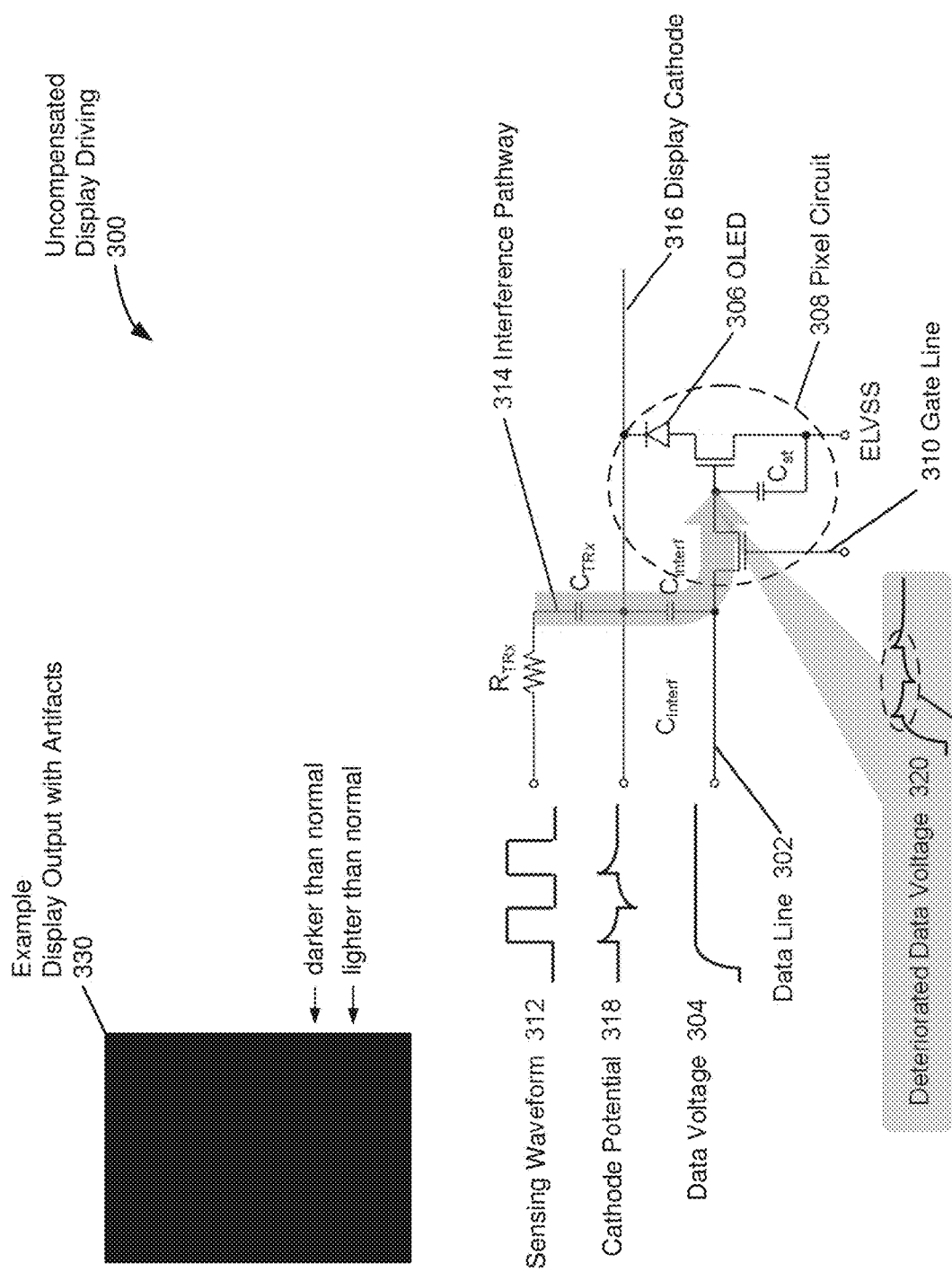
FIG. 3 shows an uncompensated display driving.

Turning to FIG. 3, an uncompensated display driving (300) is shown. A data line (302) carries a data voltage (304) for driving a pixel, e.g., a single OLED (306). The data voltage (304) may originate from the source driver circuit (252), described in reference to FIG. 2. Due to resistances and capacitances that are associated with the routing trace carrying the data voltage (304) to the pixel circuit (308), the data voltage (304) includes an onset transient. Upon activation of the gate line (310) of the pixel circuit (308) by the gate driver circuit (260), the data voltage (304) on the data line (302) charges a capacitor, Gt. While the gate line (310) is active, $C_{st}$ is, thus, being programmed with the data voltage. After the programming, the voltage over $C_{st}$ may be used to specify a current through the OLED (306). Accordingly, the output (brightness) of the OLED (306) may be governed by the data voltage (304), with a higher data voltage generally resulting in an increased light output. The driving of an OLED, while illustrated for a single OLED, may be performed for all OLEDs of a display screen. Variations of the pixel circuits may be used, without departing from the disclosure. Further, other previously mentioned display technologies may be used, without departing from the disclosure.

In one or more embodiments, a touch sensing occurs, at least in part, simultaneously with the driving of the display. As a result, the sensing waveform (312) may capacitively couple onto the data voltage (304) at the pixel circuit (308), via an interference pathway (314) (gray arrow). Specifically, as illustrated, the sensing waveform (312) may modulate the cathode potential (318), resulting in the cathode potential waveform shown in FIG. 3, based on an RC time constant associated with, for example, $R_{TRx}$ and $C_{TRx}$. An interference capacitance, $C_{interf}$, between the cathode layer of the display (display cathode (316)) and the data line (302) may further couple the sensing waveform (312) onto the data voltage (304), thereby resulting in the deteriorated data voltage (320). The deteriorated data voltage (320), thus, includes an artifact on the data voltage (322) (e.g., a voltage fluctuation as illustrated in FIG. 3), caused by the sensing waveform (312). The artifact (322) of the deteriorated data voltage (320) may cause a fluctuation in the output of the OLED (306).

In FIG. 3, the example display output with artifacts (330) illustrates possible artifacts in the display output. In the example, the artifacts include a non-homogeneous display output with rows of pixels that are lighter than normal and rows of pixels that are darker than normal. Some rows of pixels are lighter, and some rows of pixels are darker, based on the capacitors, $C_{st}$ of the OLEDs in the darker and lighter regions in the display output being charged to different voltages, as a result of the artifact (322) on the deteriorated data voltage (320). While the described effect may occur in any type of sensing display module, the effect may be particularly noticeable, and thus undesirable, in OLED-based sensing display modules (e.g., flexible, rollable and/or foldable OLED sensing display) where the layers (as shown in FIG. 2A) are highly integrated with minimal spacing, thus resulting in increased capacitive couplings (e.g., $C_{interf}$) between conductive elements. Further, the described effect may be particularly prominent when an absolute capacitive sensing is employed, because all capacitive sensing electrodes involved in the absolute capacitive touch sensing may be modulated with signals having the same phase. However, the effect may also be noticeable in transcapacitive sensing configurations, where only some of the capacitive sensing electrodes may be modulated or where an opposite phase modulation may be used to reduce the effect. Similarly, the effect may also be noticeable in hybrid sensing configurations which combine an absolute capacitive sensing and a transcapacitive sensing.

A data voltage artifact (322) may be caused by a transient (e.g., a rising or falling edge) of the sensing waveform (312). The effect of the transient may be temporary, i.e., after an initial deflection in the data voltage, the effect may decrease over time. Assuming that $C_{st}$ is programmed with the data voltage during a gate control pulse (the time interval during which the gate line (310) is active), the effect of the data voltage artifact (322) on the display output (330) may, thus, be different, depending on the timing. For example, if the data voltage artifact (322) occurs early during the gate control pulse, the data voltage artifact (322) may subside before the end of the gate control pulse, and the data voltage programmed into $C_{st}$ may, thus, be accurate. In this case, the data voltage artifact (322) may not cause a visually perceivable artifact in the display output. In contrast, when the data voltage artifact (322) occurs towards the end of the gate control pulse, there may not be sufficient time for the data voltage artifact to die down. In this case, the data voltage stored in $C_{st}$ may have an offset, which may result in a visually perceivable artifact in the display output.

In view of the above, in one or more embodiments, a gate control pulse is adjusted to avoid situations in which a transient in the sensing waveform (312) occurs late during the gate control pulse. Specifically, in one or more embodiments, when the transient is determined to occur late during the gate control pulse, the duration of the gate control pulse is reduced such that the gate control pulse ends before the transient occurs. Whether the transient occurs late or not is determined using a critical time window, as discussed below. As a result of adjusting the gate control pulse, the transient does not alter the data voltage stored in $C_{st}$. In contrast, when the transient is determined to occur early during the gate control pulse, the gate control pulse may be used without shortening, because the effect of the transient on the data voltage programmed into $C_{st}$ vanishes or is minimal by the time the gate control pulse ends. Methods for adjusting gate control pulses are subsequently described in reference to FIG. 4.

Figure 4:
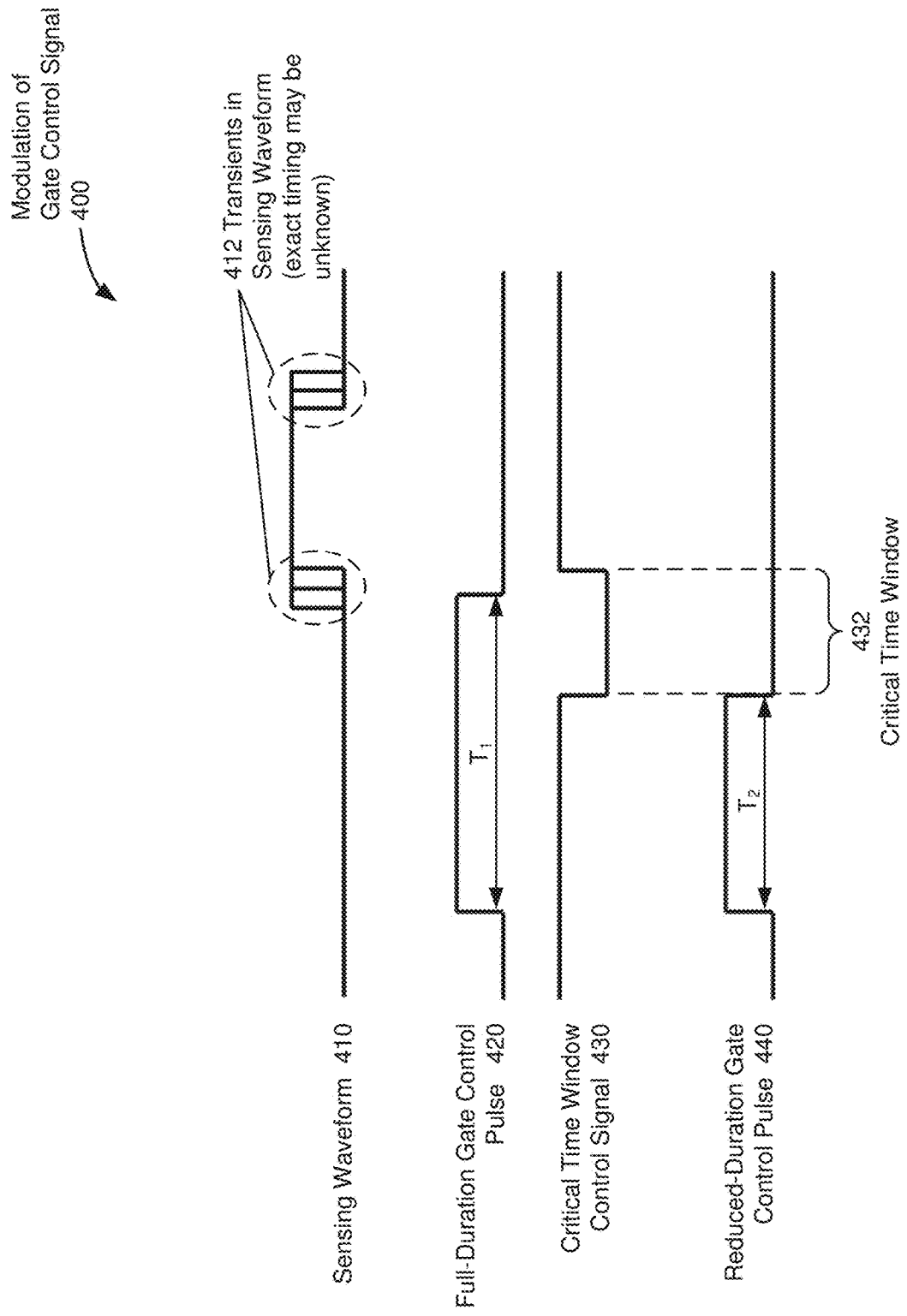
FIG. 4 shows a modulation of a gate control signal, in accordance with one or more embodiments.

Turning to FIG. 4, a modulation of a gate control signal, in accordance with one or more embodiments, is shown. The gate control signal includes gate control pulses. FIG. 4 shows a sensing waveform (410), a full-duration gate control pulse (420), a critical time window control signal (430), and a reduced-duration gate control pulse (440). Each of these elements is subsequently described.

The sensing waveform (410) may correspond to the previously described sensing waveform (312). The sensing waveform may be a square waveform, a trapezoidal waveform, or any other waveform and may include transients (412), e.g., rising and falling edges of the sensing waveform (410). The sensing waveform (410) may be emitted while one or more pixel circuits (308) are operated.

To charge the capacitor, $C_{st}$, of a pixel circuit, a full-duration gate control pulse (420) or a reduced-duration gate control pulse (440) may be provided to the pixel circuit via a gate line. A programming of the data voltage into $C_{st}$ via the corresponding data line may occur by charging $C_{st}$ using the data voltage, while the gate control pulse (full-duration gate control pulse (420) or a reduced-duration gate control pulse (440)) is active. While only a single full-duration gate control pulse (420) and a single reduced-duration gate control pulse (440) are shown, a gate control signal may include series of periodically provided gate control pulses (full-duration gate control pulses (420) and/or reduced-duration gate control pulses (440)) to enable a periodic programming of a data voltage into $C_{st}$, e.g., when transitioning from a previous image frame having been displayed to a current image frame to be displayed. In one or more embodiments, whether the full-duration gate control pulse (420) or the reduced-duration gate control pulse (440) is used to enable programming of the data voltage into $C_{st}$ depends on where the transient (412) is located in time, relative to a critical time window (432). In one or more embodiments, the critical time window (432) is superimposed on the full-duration gate control pulse (420) to partially overlap with the full-duration gate control pulse (420). As shown in FIG. 4, the critical time window (432) overlaps with the full-duration gate control pulse (420) at the end of the full-duration gate control pulse (420), and extends towards the beginning of the full-duration gate control pulse (420). The critical time window (432) may also extend slightly past the end of the full-duration gate control pulse (420). Possible durations of the critical time window (432) are discussed below. In one or more embodiments, the critical time window (432) is represented by the critical time window control signal (430).

In one or more embodiments, when a transient (412) occurs during the critical time window (432), the full-duration gate control pulse (420) with a duration $T_1$ is shortened to obtain a reduced-duration gate control pulse (440) with a duration $T_2$, for controlling the programming of the data voltage into $C_{st}$. The reduced-duration gate control pulse (440) may end prior to the critical time window (432), e.g., immediately prior to the critical time window. As a result, the programming of the data voltage into $C_{st}$ ends prior to the occurrence of the transient (412) and is, thus, not affected by the transient.

In one or more embodiments, when a transient (412) occurs outside the critical time window (432), e.g., prior to the critical time window, the full-duration gate control pulse (420) may be used for controlling the programming of the data voltage into $C_{st}$. While the transient (412) may cause a data voltage artifact, sufficient time may remain for the data voltage artifact to die down, and the artifact may thus not cause a perceivable artifact in the display output.

In order to determine the presence of an artifact during the critical time window, timing information of the transient may be required. In one or more embodiments, the analog frontend (256) provides a timing of the sensing waveform (312). Accordingly, the timing of the transients (412) may be obtained from the circuits controlling analog frontend (256). In one or more embodiments, only an approximate but not necessarily highly accurate timing information is needed, if the critical time window (432) slightly extends past the end of the full-duration gate control pulse (420) to provide a margin for inaccurate timing information. For example, assuming an accuracy of +/−10 ns of the timing information, a critical time window (432) extending by at least 10 ns past the end of the full-duration gate control pulse may be sufficient.

Figure 5:
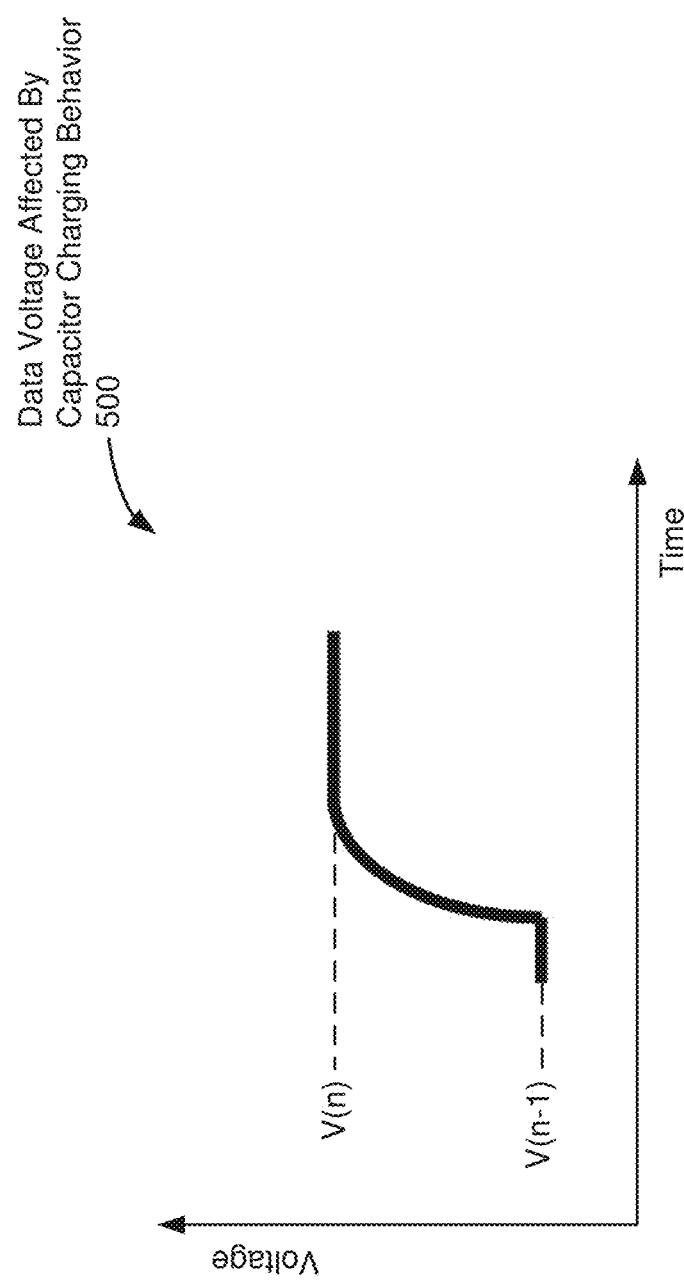
FIG. 5 shows a data voltage affected by a capacitor charging behavior, in accordance with one or more embodiments.

Turning to FIG. 5, a data voltage affected by a capacitor charging behavior, in accordance with one or more embodiments, is shown. The data voltage affected by the capacitor charging behavior (500) may be observed when charging the capacitor, $C_{st}$, of a pixel circuit from a data voltage V(n−1) to a data voltage V(n). Assume that the data voltage V(n−1) is for a previous image frame, and that the data voltage V(n) is for a current image frame. V(n) is higher than V(n−1), e g., because the current image frame specifies a higher pixel brightness than the previous image frame. Accordingly, in the example of FIG. 5, the data voltage is increased during the transition from the previous image frame to the current image frame. The RC behavior illustrated in FIG. 5 may be governed by an RC time constant associated with, for example, the capacitance of the capacitor, $C_{st}$, and a resistance, e.g., a resistance of the data line. As a result, any voltage change is governed by the RC time constant, and may generally follow the saturating exponential $1-e^{-t/RC}$.

In one or more embodiments, the duration, $T_1$, of the full-duration gate control pulse (420) is sufficiently long for the data voltage to stabilize during the transition from V(n−1) to V(n), for the maximum possible voltage change (e.g., when a pixel is switched from completely dark to maximum brightness).

The data voltage at time $T_1$ may be:

$$V(n,T_1)=V(n-1)+(V(n)-V(n-1))(1-e^{T_1/R_C}).$$

If $T_1$ is sufficiently long, the data voltage may essentially converge toward a steady state at V(n). However, with $T_2$ being shorter than $T_1$, the steady state may not be reached, during a reduced-duration gate control pulse (440). Instead, the data voltage at time $T_2$ may be:

$$V(n,T_2)=V(n-1)+(V(n)-V(n-1))(1-e^{T_2/RC}),$$

with an undesirable delta of:

$$\Delta V(n,T_2)=(V(n)-V(n-1))(e^{T_1/RC}-e^{T_2/RC}).$$

In one or more embodiments, in order to compensate for the undesirable delta, a V'(n) may be applied instead of V (n), during $T_2$. If correctly selected, the application of V' (n) may result in the data voltage at $T_2$ to reach the voltage that would otherwise be obtained at $T_1$. To obtain a delta of zero, $$V'(n) = \frac{1}{1-e^{-T_2/RC}}[V(n)-V(n-1)]\left(1-e^{-T_1/RC}\right)+V(n-1)$$

may be used.

Accordingly, the data voltage may be adjusted from V (n) to V (n) to compensate for the reduction of the duration of the gate control pulse from $T_1$ to $T_2$. Despite the reduced time available for charging $C_{st}$, the desired data voltage may be reached, when using V'(n) to charge $C_{st}$.

Turning to FIG. 6, a simulation example (600), in accordance with one or more embodiments, is shown. In the example, the effectiveness of the compensation resulting from the use of V (n) instead of V (n) is demonstrated. The first column of the table in FIG. 6 includes DAC codes, i.e., commanded digital-to-analog converter values. The DAC codes specify V (n). Assuming an 8-bit DAC with an output range of 0-4V, the resolution of the DAC is 15.625 mV/LSB. For the rows of the table, the DAC code is randomly generated. For example, for a first image frame, the DAC code is 181, for the second image frame the DAC code is updated to 8, etc. Each DAC code translates into a DAC voltage. The following description of the table of FIG. 6 is based on the third row (representing the third image frame) of the table. A DAC code 71 is selected, which corresponds to a DAC voltage of 1.1094V. The capacitor is, thus, charged from 0.1432V (DAC voltage of image frame 2 at $T_1$) to 1.1094V (DAC voltage of image frame 3). Based on the simulation, at $T_1$, the voltage over the capacitor would reach 1.1027V, as a result of the previously discussed saturating exponential capacitor charging behavior. However, at $T_2$, the voltage over the capacitor would reach only 1.0913V, i.e., if the charging of the capacitor stopped at $T_2$, a delta of 0.0114V would remain. The delta corresponds to a DAC code of 0.7, based on the specifications of the DAC. Using V' (n) instead of V (n), the DAC code after compensation is 72, and the resulting compensated voltage over the capacitor at $T_2$ is 1.1067V, suggesting that the compensation reduces the delta from originally 0.0114V to −0.004V. Inspection of the entire table shows that a maximum error caused by shortening the time interval available for charging the capacitor from $T_1$ to $T_2$ is reduced from −2.7 (delta code, row 10) to −0.4 (delta code, row 7).

The simulation example (600) suggests that a compensation for a shortened time interval used for charging $C_{st}$ is possible. The duration of the critical time window (432) may be determined based on the following considerations: The duration of the critical time window (432) directly affects the duration $T_2$ of the reduced-duration gate control pulse which determines the time interval available for charging $C_{st}$. A longer critical time window (432) results in a shorter $T_2$, and a shorter critical time window (432) results in a longer $T_2$. If the critical time window (432) is too short, then not enough time may be available for the data voltage artifact to die down before the end of the reduced-duration gate control pulse. If the critical time window (432) is too long, then the charging time available for the charging $C_{st}$ may be too short. While the simulation example (600) shows that a reduced charging time $T_2$ can be compensated for by adjusting the data voltage from V(n) to V'(n), the accuracy of the compensation depends on the accuracy of the time constant, RC, assumed for the simulation. With an increasingly shorter $T_2$, the sensitivity to inaccurate estimates of RC increases, potentially resulting in increased errors in the voltage over $C_{st}$ at $T_2$. Based on the above, the duration of the critical time window (432) may be within a certain range. The duration of the critical time window (432) may be set based on RC. For example, a tradeoff between the described factors may be to set the duration of the critical time window between 1 RC and 2 RC. This duration may result in a $T_2$ that is long enough to avoid a high sensitivity of the compensation to the accuracy of the time constant, while proving sufficient time for a data voltage artifact on the data voltage to die down. The duration of the critical time window may be optimized depending on the specifics of a particular input-display device (200), timing considerations, etc.

Figure 7A:
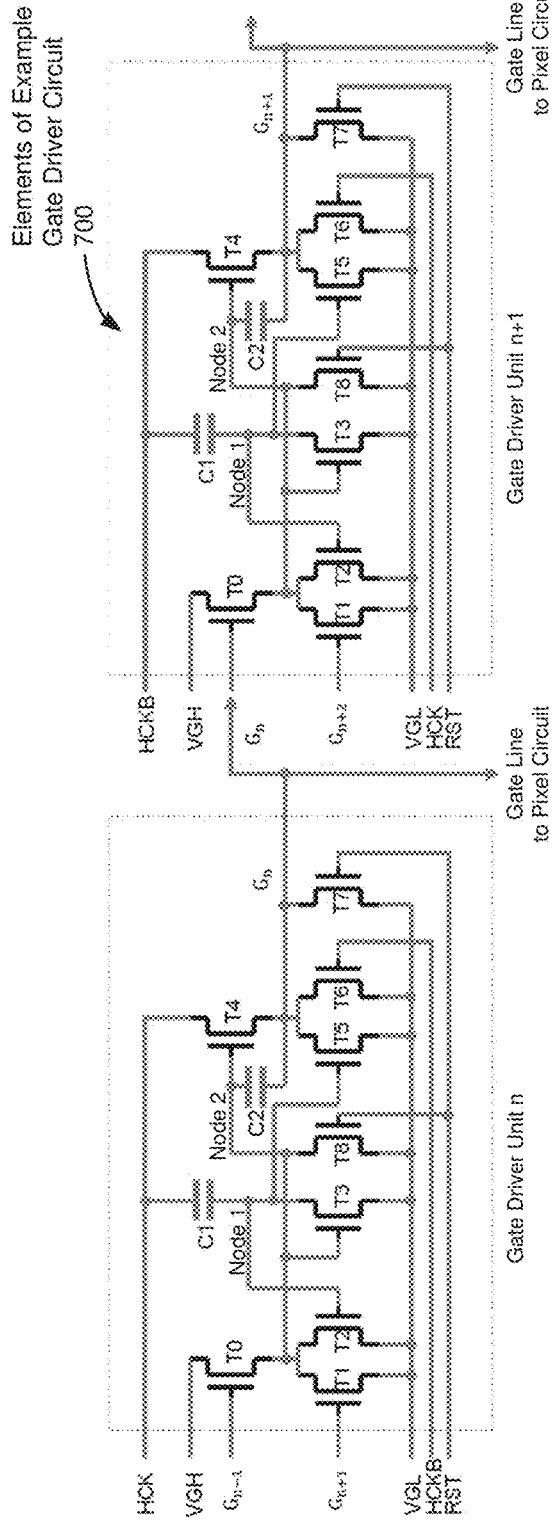
FIG. 7A shows elements of an example gate driver circuit, in accordance with one or more embodiments.

Turning to FIG. 7A, elements of an example gate driver circuit, in accordance with one or more embodiments, are shown. The elements of the example gate driver circuit (700) may be a component of the gate driver circuit (260), described in reference to FIG. 2. The gate driver circuit (260) may be configured to control the operation of N pixel columns, e.g., pixel columns 0 . . . N−1. Accordingly, the gate driver circuit (260) may output N gate control signals. Each of these gate control signals may control pixels in a pixel column. The combination of all gate control signals may thus control all pixels of a display screen. In the example of FIG. 7A, the elements of a gate driver circuit for driving two pixel columns (gate driver unit n, gate driver unit n+1) are shown.

In one or more embodiments, the gate driver circuit (260) operates analogous to a shift register in that a clock signal is shared by a series of logic circuits arranged in a cascade. Each logic circuit forms a gate driver unit (gate driver unit n, gate driver unit n+1 in FIG. 7A). In this cascade configuration, each gate driver unit, except the first gate driver unit in the cascade, receives its input from the output of the preceding gate driver unit. The first gate driver unit may receive an external input.

Figure 7B:
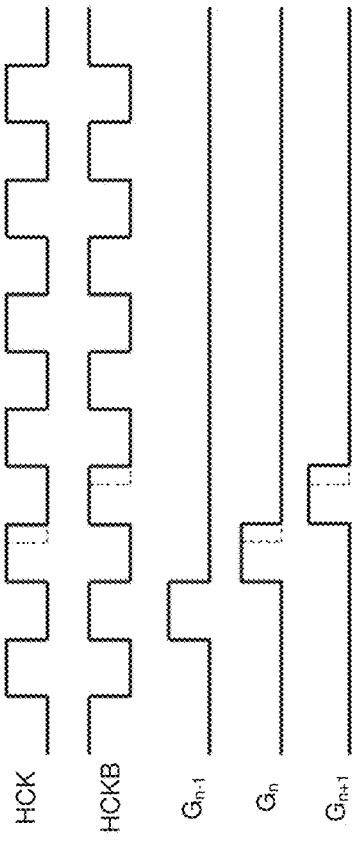
FIG. 7B shows an example output of a gate driver circuit, in accordance with one or more embodiments.

In a zero-based numbering scheme, even-numbered gate driver units (gate driver unit n) are configured to output a gate control signal when the clock signal is in a "high" state, whereas odd-numbered gate driver units (gate driver unit n+1) are configured to output a gate control signal when the clock signal is in a "low" state, in accordance with one or more embodiments. Accordingly, with a clock cycle consisting of "low" and "high" half-cycles, two adjacently located gate driver units in the cascade may consecutively output a gate control signal to the pixels that are connected to these gate driver units by gate lines, as shown in FIG. 3. As the input, initially provided to the first gate driver unit in the cascade, propagates through the cascade, the gate driver circuits may consecutively output a gate control signal $G_n$. The output by the gate driver units is illustrated in FIG. 7B. The gate control signals of even-numbered gate driver circuits may be synchronized with "high" states of the clock signal, whereas the gate control signals of odd-numbered gate driver units may be synchronized with "low" states of the clock signal.

The gate driver unit operation may be described as follows: Transistor 4 (T4) connects to HCK (clock signal) or HCKB (inverted clock signal), respectively, for the even/odd numbered gated driver units. Initially, an RST pulse (reset signal) may be issued to T7 to reset the gate control signals ($G_n$, $G_{n+1}$, ... ) to low, and further to discharge C2 through T8. Then, for gate driver unit $G_n$, when the $G_{n-1}$ pulse arrives while HCK is low, C2 is charged through T0, with C2 being connected to VGL (low supply voltage) through T6, and with HCKB being high. At the time when HCK goes high and HCKB goes low, T6 turns off. The voltage on C2 turns on T4, and output $G_n$ goes high for a half-cycle until HCK goes low. The voltage on C2 eventually reaches zero, and therefore T4 can no longer turn on again, thus keeping $G_n$ low. Similarly, the $G_n$ pulse turns on T0 of gate driver unit n+1 to charge C2 of that gate driver unit. When HCK goes low and HCKB goes high, $G_{n+1}$ also goes high, which discharges C2 so that when HCK goes high again, the voltage on C2 is around zero and does no longer turn on T4. Accordingly, $G_n$ is prevented from going high again.

In addition, when the voltage of node 2 is low, T3 is turned off. The voltage of node 1 follows HCK, so that either HCK is high or HCKB is high, and one of T5 and T6 is turned on, thereby ensuring that $G_n$ is not floating. When the voltage of node 2 is high, then T3 is turned on, and node 1 is low. T5 is turned off while T4 is on.

While the above description is for gate driver unit $G_n$, other gate driver units may operate in a similar manner. Further, even and odd numbered gate driver units operate alternatingly but are otherwise similar.

Further, while a particular implementation of gate driver units is shown, alternative implementations that may be functionally equivalent or similar are within the scope of the disclosure and may produce gate control signals similar or identical to those shown in FIG. 7B.

Turning to FIG. 7B, an example output of a gate driver circuit (750), in accordance with one or more embodiments, is shown. Gate control signals are provided by three gate driver units ($G_{n-1}$, $G_n$, and $G_{n+1}$). In the example, the gate control pulse emitted by gate driver circuit $G_{n-1}$ is a full-duration gate control pulse. The gate control pulses emitted by gate driver circuits $G_n$ and $G_{n+1}$ are reduced-duration gate control pulses (dashed line). In one or more embodiments, the reduced-duration gate control pulses are generated by modulating HCK and HCKB, as shown (dashed line). No other components or circuit modifications on the gate control units are necessary to change the duration of the gate control pulses.

Figure 8:
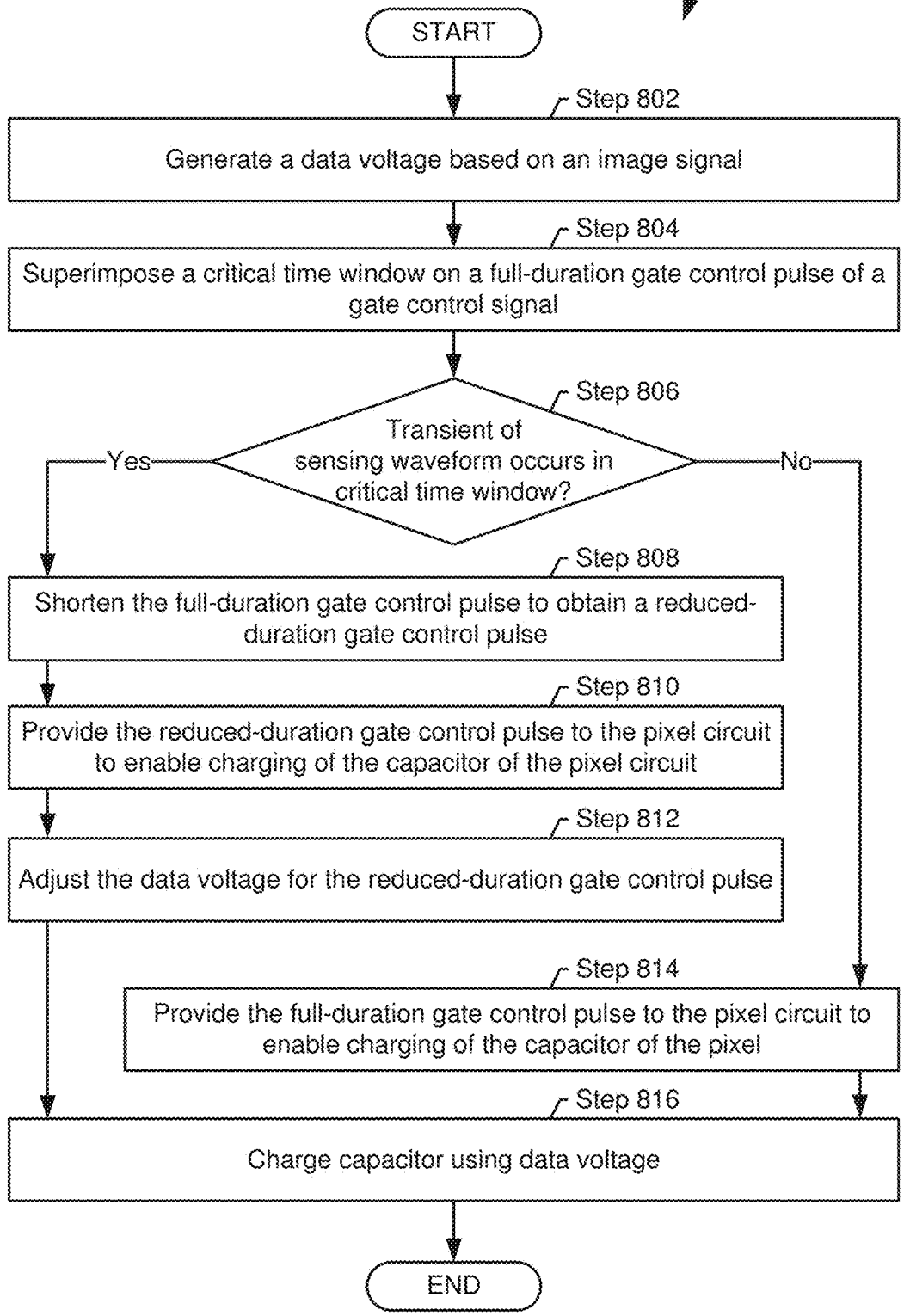
FIG. 8 shows a flowchart in accordance with one or more embodiments.

FIG. 8 shows a flowchart in accordance with one or more embodiments. While the various steps in this flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 8.

The flowchart of FIG. 8 depicts a method for driving a display of an input-display device, in accordance with one or more embodiments. While the following description covers the driving of a single pixel circuit associated with a single display pixel, the same steps may be performed to drive additional pixel circuits of an input-display device.

In Step 802, a data voltage is generated for driving the pixel circuit. The data voltage may be generated based on an image signal. For example, an image signal may be received by an image processing circuit. The image signal may be received from a host application processor. The image processing circuit may perform various operations as previous described, to generate a processed image signal. The source driver circuit may operate on the processed image signal to generate the data voltage, as previously described.

In Step 804, a critical time window is superimposed on a full-duration gate control pulse of a gate control signal, e.g., as described in reference to FIG. 4. The critical time window may partially overlap with the full-duration gate control pulse, at least at the end of the full-duration gate control pulse.

In Step 806, a test is performed to determine whether a transient of the sensing waveform occurs in the critical time window. The test may be performed based on a timing of the transient. The timing of the transient may be obtained from an analog frontend configured to generate the sensing waveform, as previously described. If the transient occurs in the critical time window, the method may proceed with the execution of Step 808. If the transient occurs outside the critical time window, the method may proceed with the execution of Step 814.

In Step 808, the full-duration gate control pulse is shortened to obtain a reduced-duration gate control pulse, as previously described in reference to FIG. 4.

In Step 810, the reduced-duration gate control pulse is provided to a pixel circuit to enable charging of the capacitor of the pixel circuit.

In Step 812, the data voltage is adjusted to compensate for the reduced time interval available for charging the capacitor, based on the shortening of the full-duration gate control pulse to obtain the reduced-duration gate control pulse. The adjustment may be performed based on the RC time constant associated with charging the capacitor. A detailed description is provided in reference to FIGS. 5 and 6.

In Step 814, the reduced-duration gate control pulse is provided to the pixel circuit to enable charging of the capacitor of the pixel circuit.

In Step 816, the capacitor of the pixel circuit is charged using the data voltage. The charging may occur during either the reduced-duration gate control pulse, or during the full-duration gate control pulse, depending on whether, in Step 806, the transient of the sensing waveform occurred during the critical time window or not.

Embodiments of the disclosure enable suppression or reduction of display artifacts without altering the voltage or frequency of the sensing waveform. Embodiments of the disclosure thus allow the touch sensing parameters for the sensing waveform to be determined based on other considerations (such as the sensing frequency being determined based on touch sensor RC bandwidth, avoiding frequencies for display noise, and noisy chargers), thereby making the input-display device easier to configure and more robust. Embodiments of the disclosure may be implemented without or with minimal hardware changes. For example, a modulation of a gate control signal may be accomplished by modulation of a clock signal and, thus, does not require modified gate driver circuits. Further, even though display operations and sensing operations may not be synchronized, the timing information exchanged to perform the described methods does not have to be highly accurate, thus increasing the robustness and performance of the method while reducing cost.

Embodiments of the disclosure may be suitable for implementation using a TDDI architecture, combining the source driver circuit associated with the displaying of images and the analog frontend associated with the touch sensing. Embodiments of the disclosure may also be used where the source driver circuit is separate from the analog frontend.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. An input-display device, comprising:
a display screen comprising a plurality of display pixels;
a plurality of capacitive sensing electrodes for capacitive sensing in a sensing region of the display screen; and
a gate driver circuit associated with the display screen and configured to:
superimpose a critical time window on a first full-duration gate control pulse of a gate control signal, wherein the critical time window partially overlaps with the first full-duration gate control pulse at least at an end of the first full-duration gate control pulse,
make a first determination that a first transient in a sensing waveform of the capacitive sensing occurs in the critical time window superimposed on the first full-duration gate control pulse,
based on the first determination, shorten the first full-duration gate control pulse to obtain a reduced-duration gate control pulse, and
provide the reduced-duration gate control pulse to a pixel circuit of one of the plurality of display pixels to enable charging of a capacitor of the pixel circuit.

2. The input-display device of claim 1,
wherein the gate driver circuit is further configured to:
superimpose the critical time window on a second full-duration gate control pulse of the gate control signal,
make a second determination that a second transient in the sensing waveform occurs outside the critical time window superimposed on the second full-duration gate control pulse, and
provide the second full-duration gate control pulse to the pixel circuit.

3. The input-display device of claim 1, further comprising:
a source driver circuit configured to:
generate a data voltage based on an image signal, and
provide the data voltage to charge the capacitor.

4. The input-display device of claim 3,
wherein generating the data voltage comprises:
adjusting the data voltage to compensate for a reduced time interval available for the charging of the capacitor based on the shortening of the first full-duration gate control pulse to obtain a reduced-duration gate control pulse.

5. The input-display device of claim 3, further comprising:
a touch and display driver integration (TDDI) circuit comprising:
the gate driver circuit,
the source driver circuit, and
an analog frontend for the capacitive sensing, the analog frontend interfacing with the plurality of capacitive sensing electrodes to obtain a plurality of touch signals,
wherein the analog frontend is configured to:
generate the sensing waveform, and
provide a timing of the first transient to the gate driver circuit.

6. The input-display device of claim 1,
wherein the shortening of the first full-duration gate control pulse to obtain a reduced-duration gate control pulse comprises modulating a clock of the gate driver circuit.

7. A display driver circuit for driving a display screen, the display driver comprising:
a gate driver circuit configured to:
superimpose a critical time window on a first full-duration gate control pulse of a gate control signal, wherein the critical time window partially overlaps with the first full-duration gate control pulse at least at an end of the first full-duration gate control pulse,
make a first determination that a first transient in a sensing waveform of a capacitive sensing occurs in the critical time window superimposed on the first full-duration gate control pulse,
based on the first determination, shorten the first full-duration gate control pulse to obtain a reduced-duration gate control pulse, and
provide the reduced-duration gate control pulse to a pixel circuit of one of a plurality of display pixels of the display screen to enable charging of a capacitor of the pixel circuit.

8. The display driver circuit of claim 7,
wherein the gate driver circuit is further configured to:
superimpose the critical time window on a second full-duration gate control pulse of the gate control signal,
make a second determination that a second transient in the sensing waveform occurs outside the critical time window superimposed on the second full-duration gate control pulse, and
provide the second full-duration gate control pulse to the pixel circuit.

9. The display driver circuit of claim 7, further comprising:
 a source driver circuit configured to:
  generate a data voltage based on an image signal, and provide the data voltage to charge the capacitor.

10. The display driver circuit of claim 9,
 wherein generating the data voltage comprises:
  adjusting the data voltage to compensate for a reduced time interval available for the charging of the capacitor based on the shortening of the first full-duration gate control pulse to obtain a reduced-duration gate control pulse.

11. The display driver circuit of claim 10,
 wherein the adjusting the data voltage is based on an RC time constant associated with charging the capacitor.

12. The display driver circuit of claim 9,
 wherein the display driver circuit is comprised in a touch and display driver integration (TDDI) circuit in combination with an analog frontend for the capacitive sensing, the analog frontend interfacing with a plurality of capacitive sensing electrodes to obtain a plurality of touch signals,
  wherein the analog frontend is configured to generate the sensing waveform.

13. The display driver circuit of claim 7, wherein the shortening of the first full-duration gate control pulse to obtain a reduced-duration gate control pulse comprises modulating a clock of the gate driver circuit.

14. The display driver circuit of claim 7, wherein the shortening of the first full-duration gate control pulse to obtain a reduced-duration gate control pulse is by one selected from the group consisting of one and two RC time constants associated with charging the capacitor.

15. A method for driving a display screen of an input-display device by a gate driver circuit, the method comprising:
 superimposing a critical time window on a first full-duration gate control pulse of a gate control signal, wherein the critical time window partially overlaps with the first full-duration gate control pulse at least at an end of the first full-duration gate control pulse;
 making a first determination that a first transient in a sensing waveform of a capacitive sensing occurs in the critical time window superimposed on the first full-duration gate control pulse;
 based on the first determination, shortening the first full-duration gate control pulse to obtain a reduced-duration gate control pulse; and
 providing the reduced-duration gate control pulse to a pixel circuit of one of a plurality of display pixels of the display screen to enable charging of a capacitor of the pixel circuit.

16. The method of claim 15, further comprising:
 superimposing the critical time window on a second full-duration gate control pulse of the gate control signal;
 making a second determination that a second transient in the sensing waveform occurs outside the critical time window superimposed on the second full-duration gate control pulse; and
 providing the second full-duration gate control pulse to the pixel circuit.

17. The method of claim 15, further comprising:
 generating a data voltage based on an image signal, comprising:
  adjusting the data voltage to compensate for a reduced time interval available for the charging of the capacitor based on the shortening of the first full-duration gate control pulse to obtain a reduced-duration gate control pulse; and
 providing the data voltage to charge the capacitor.

18. The method of claim 15, further comprising obtaining a timing of the first transient from an analog frontend,
 wherein the analog frontend is configured to generate the sensing waveform.

19. The method of claim 15,
 wherein the shortening of the first full-duration gate control pulse to obtain a reduced-duration gate control pulse comprises modulating a clock of the gate driver circuit.

20. The method of claim 19,
 wherein the shortening of the first full-duration gate control pulse to obtain a reduced-duration gate control pulse is by one selected from the group consisting of one and two RC time constants associated with charging the capacitor.

* * * * *